United States Patent
Keränen et al.

(10) Patent No.: US 11,930,115 B2
(45) Date of Patent: Mar. 12, 2024

(54) MANAGEMENT OF DEVICES JOINING A NETWORK

(71) Applicant: Telefonaktiebolaget LM Ericsson (publ), Stockholm (SE)

(72) Inventors: Ari Keränen, Helsinki (FI); Gonzalo Camarillo Gonzalez, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 199 days.

(21) Appl. No.: 17/275,085

(22) PCT Filed: Sep. 12, 2018

(86) PCT No.: PCT/EP2018/074598
§ 371 (c)(1),
(2) Date: Mar. 10, 2021

(87) PCT Pub. No.: WO2020/052747
PCT Pub. Date: Mar. 19, 2020

(65) Prior Publication Data
US 2021/0258163 A1    Aug. 19, 2021

(51) Int. Cl.
*H04L 9/32* (2006.01)
*H04L 9/06* (2006.01)
*H04L 9/40* (2022.01)

(52) U.S. Cl.
CPC .......... *H04L 9/3213* (2013.01); *H04L 9/0643* (2013.01); *H04L 63/0853* (2013.01)

(58) Field of Classification Search
CPC . H04L 9/3213; H04L 9/0643; H04L 63/0853; H04L 9/0866; H04L 9/3236;
(Continued)

(56) References Cited

U.S. PATENT DOCUMENTS 10,630,682 B1 * 4/2020 Bhattacharyya ...... H04L 63/061
2011/0161503 A1    6/2011 Krebs
(Continued)

FOREIGN PATENT DOCUMENTS

EP    3367629 A1    8/2018
GB    2573563 A  * 11/2019 ........... G06F 21/445

OTHER PUBLICATIONS

International Search Report and Written Opinion of the International Searching Authority, PCT/EP2018/074598, dated Jan. 18, 2018, 14 pages.
(Continued)

*Primary Examiner* — Izunna Okeke
(74) *Attorney, Agent, or Firm* — Sage Patent Group

(57) ABSTRACT

A method by a management node for managing a device operable to join a network includes receiving from the device a request to join the network, the request including a device specific parameter and a token, and generating an authentication parameter from the device specific parameters and the token. The method further includes authorising the device to join the network if the authentication parameter fulfils a validity criterion. Generating an authentication parameter from the device specific parameters and the token includes generating an input including the device specific parameters and the token, computing a cryptographic function of the generated input, and setting an output of the cryptographic function as the authentication parameter. Also disclosed are a method for operating a device, a management node, a device and a computer program.

23 Claims, 10 Drawing Sheets

(58) Field of Classification Search
CPC .. H04L 9/3297; H04L 63/0807; H04W 12/61;
H04W 12/71; H04W 12/76; H04W 4/70;
H04W 12/06
See application file for complete search history.

(56) References Cited

U.S. PATENT DOCUMENTS

2014/0172229 A1    6/2014  Rude et al.
2015/0148009 A1*   5/2015  Webb .................. H04L 63/0884
                                                                  455/26.1
2016/0301695 A1*  10/2016  Trivelpiece ........... H04W 12/04

OTHER PUBLICATIONS

Bormann, C. et al., Internet Engineering Task Force (IETF), RFC 7228, "Terminology for Constrained-Node Networks," May 2014, 17 pages.
Shelby, Z. et al., Internet Engineering Task Force (IETF), RFC 7252, "The Constrained Application Protocol (CoAP)," Jun. 2014, 112 pages.

* cited by examiner

MANAGEMENT OF DEVICES JOINING A NETWORK

CROSS REFERENCE TO RELATED APPLICATIONS

This application is a 35 U.S.C. § 371 national stage application of PCT International Application No. PCT/EP2018/074598 filed on Sep. 12, 2018, the disclosure and content of which is incorporated by reference herein in its entirety.

TECHNICAL FIELD

The present disclosure relates to methods for managing and operating a device that is operable to join a network. The present disclosure also relates to a device, to a management node and to a computer program and a computer program product configured, when run on a computer to carry out methods performed in a management node and a device.

BACKGROUND

The "Internet of Things" (IoT) refers to devices enabled for communication network connectivity, so that these devices may be remotely managed, and data collected or required by the devices may be exchanged between individual devices and between devices and application servers. Such devices are often subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as Internet Protocol (IPv4 or IPv6), and dedicated protocols for constrained devices, including the Constrained Application Protocol (CoAP), as defined in Internet Engineering Task Force (IETF) RFC7252. Management of constrained devices may be performed using any suitable management protocol, including for example the Lightweight Machine to Machine (LWM2M) protocol, defined by the Open Mobile Alliance. LWM2M is designed to operate over CoAP.

Constrained devices are frequently deployed as a self-contained IoT network or system, with the constrained devices of the IoT system connecting to a core network via gateways using short range radio technologies. Information collected from the constrained devices may then be used to create value in cloud environments. The IoT system may be managed by a server node which controls access to the system. When a new node seeks to join the IoT system, the server node typically runs an authorisation process in order to decide whether or not the new node can be admitted into the system. For example, the server node may be configured with the public keys of nodes that may be authorised to join the system, and may check the public key of any node seeking to join the system as part of the authorisation process.

Configuration of the authorisation process for new nodes at the managing server node can be time consuming. In systems with high security requirements, this investment of time is justified by the security afforded by the authorisation process. However, in systems with lower security requirements, an authorisation process that is more convenient to configure, even if it provides a lower level of security than existing processes may be desirable.

SUMMARY

It is an aim of the present disclosure to provide a method, apparatus and computer readable medium which at least partially address one or more of the challenges discussed above.

According to a first aspect of the present disclosure, there is provided a method for managing a device operable to join a network. The method, performed by a management node, comprises receiving from the device a request to join the network, the request comprising a device specific parameter and a token, and generating an authentication parameter from the device specific parameter and the token. The method further comprises authorising the device to join the network if the authentication parameter fulfils a validity criterion. Generating an authentication parameter from the device specific parameters and the token comprises generating an input comprising the device specific parameter and the token, computing a cryptographic function of the generated input, and setting an output of the cryptographic function as the authentication parameter.

According to examples of the present disclosure, the device may comprise a constrained device. For the purposes of the present disclosure, a constrained device comprises a device which conforms to the definition set out in section 2.1 of RFC 7228 for "constrained node". According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitor and other sensors for personal health (continuous monitoring of blood pressure etc.) actuators and connected electronic door locks.

According to examples of the present disclosure, the management node performing the method may comprise a management server may comprise an IoT server. The network may comprise any managed group of devices. In some examples of the present disclosure, the network may comprise an IoT system, membership of which may be managed by the management node. In further examples of the present disclosure, the network may comprise a communication network such as a 3GPP network, Local Area Network (LAN), Wide Area Network (WAN) etc.

According to examples of the present disclosure, the token received from the device may be specific to the device.

According to examples of the present disclosure, generating an input comprising the device specific parameter and the token may comprise setting each of the device specific parameter and the token as inputs, for example in the case of a cryptographic function accepting multiple inputs. In further examples of the present disclosure, generating an input comprising the device specific parameter and the token may comprise combining the device specific parameter and the token in some manner so as to form a single input. Combining may comprise concatenating the device specific parameter and token, inserting a part or all of the parameter into the token or vice versa, or any other means of combining a part or all of the parameter with a part or all of the token.

According to examples of the present disclosure, authorising the device to join the network may comprise sending an authorisation message to the device.

According to examples of the present disclosure, the cryptographic function may comprise a hash function.

According to examples of the present disclosure, the validity criterion may comprise a required value for characters in specified positions of the generated authentication parameter. According to examples of the present disclosure, the required value may comprise zero, and the specified positions of the generated authentication parameter may comprise for example the X least significant bits, X most significant bits (where X may be any number up to and including all bits in the authentication parameter), every second bit etc.

According to examples of the present disclosure, the device specific parameter may comprise at least one of a device identifier, a representation of capabilities of the device and/or a representation of device resources. According to examples of the present disclosure, the representation of device resources may comprise a listing of IPSO smart objects configured on the device, and the device identifier may comprise MAC address, public key, endpoint name etc.

According to examples of the present disclosure, the device may be associated with a time window within which the device is expected to join the network. According to such examples, generating an authentication parameter may comprise generating an input comprising the device specific parameter, the token and a representation of the time window, and computing a cryptographic function of the generated input. In some examples, the time window may be a system wide parameter, or may be otherwise obtained out of band. According to examples of the present disclosure, the representation of the time window may be in any suitable format such as a week number, day, date or time period defined in any manner.

According to examples of the present disclosure, the device may be associated with a time window within which the device is expected to join the network. According to such examples, the method may further comprise authorising the device to join the network if the authentication parameter fulfils a validity criterion and a time associated with the request to join the network falls within the time window. According to examples of the present disclosure, the time associated with the join request may be a time of receipt, a sending timestamp included with the request etc.

According to examples of the present disclosure, the device may be a member of a batch of devices operable to connect to the network. According to such examples, the request to join the network may further comprise an identifier of the batch of which the device is a member, and generating an authentication parameter may comprise generating an input comprising the device specific parameter, the token and the batch identifier, and computing a cryptographic function of the generated input.

According to examples of the present disclosure, the device may be associated with a time window within which the device is expected to join the network, and the method may further comprise checking whether the device is the first member of its batch to request to join the network, and if the device is the first member of its batch to request to join the network, setting a time associated with the request to join the network as a start time for the time window. According to examples of the present disclosure, setting a start time may comprise starting a timer associated with the time window. According to examples of the present disclosure, the duration of the time window may be selected to reflect an expected time a potential attacker would require to determine a token that would produce a valid authentication parameter on the basis of the cryptographic function and at least a device specific parameter.

According to examples of the present disclosure, the method may further comprise associating the device with other devices that are members of the same batch in a management record and sending an instruction to all devices that are members of the batch. According to examples of the present disclosure, other management operations may be performed on a batch basis, including observing resources, setting trust levels etc.

According to examples of the present disclosure, the method may further comprise generating a device specific secret from at least a master secret and the device specific parameter. According to such examples, generating an authentication parameter may comprise generating an input comprising the device specific parameter, the token and the device specific secret, and computing a cryptographic function of the generated input. According to examples of the present disclosure, the master secret may be configured into the management node performing the method in addition to a method for deriving the device specific secret from the master secret and other parameters.

According to examples of the present disclosure, the request to join the network may further comprise a device specific secret, and the method may further comprise generating a device specific secret from at least a master secret and the device specific parameter, comparing the generated device specific secret to the received device specific secret, and authorising the device to join the network if the authentication parameter fulfils a validity criterion and the generated device specific secret is identical to the received device specific secret.

According to examples of the present disclosure, generating a device specific secret may comprise generating the device specific secret from at least the master secret, the device specific parameter and at least one of a representation of capabilities of the device, a representation of device resources and/or an identifier of a batch of devices to which the device belongs.

According to examples of the present disclosure, the device specific secret may be generated from the master secret and other parameters by concatenating the master secret with the parameters and performing a secure hash over the concatenated master secret and parameters.

According to examples of the present disclosure, the method may further comprise rejecting the request from the device if the authentication parameter does not meet the validity criterion. According to examples of the present disclosure, additional actions may be taken if the authentication parameter does not meet the validity criterion, including for example sending a notification to an administrator or monitoring system etc.

According to another aspect of the present disclosure, there is provided a method for operating a device that is operable to join a network, the method, performed by the device, comprising retrieving a token from a memory, generating a message requesting to join the network, the message comprising a device specific parameter and the token, and sending the message to a management node reachable via the network. The token is such that, when combined with at least the device specific parameter and input to a cryptographic function, the token causes the cryptographic function to generate an authentication parameter satisfying a validity criterion.

According to examples of the present disclosure, the device may comprise a constrained device. For the purposes of the present disclosure, a constrained device comprises a device which conforms to the definition set out in section 2.1 of RFC 7228 for "constrained node".

According to examples of the present disclosure, the management node reachable via the network may comprise a management server may comprise an IoT server. The network may comprise any managed group of devices. In some examples of the present disclosure, the network may comprise an IoT system, membership of which may be managed by the management node. In further examples of the present disclosure, the network may comprise a communication network such as a 3GPP network, Local Area Network (LAN), Wide Area Network (WAN) etc.

According to examples of the present disclosure, the token retrieved from a memory may be specific to the device.

According to examples of the present disclosure, the cryptographic function may comprise a cryptographic hash function.

According to examples of the present disclosure, the validity criterion may comprise a required value for characters in specified positions of the generated authentication parameter. According to examples of the present disclosure, the required value may comprise zero, and the specified positions of the generated authentication parameter may comprise for example the X least significant bits, X most significant bits (where X may be any number up to and including all bits in the authentication parameter), every second bit etc.

According to examples of the present disclosure, the device specific parameter may comprise at least one of a device identifier, a representation of capabilities of the device and/or a representation of device resources. According to examples of the present disclosure, the representation of device resources may comprise a listing of IPSO smart objects configured on the device, and the device identifier may comprise MAC address, public key, endpoint name etc.

According to examples of the present disclosure, the device may be a member of a batch of devices operable to connect to the network, and the method may further comprise retrieving an identifier of the batch of which the device is a member from a memory. According to such examples, generating a message requesting to join the network may comprise generating a message comprising the device specific parameter, the token and the batch identifier.

According to examples of the present disclosure, the method may further comprise retrieving a device specific secret from a memory. According to such examples, generating a message requesting to join the network may comprise generating a message comprising the device specific parameter, the token and the device specific secret. According to examples of the present disclosure, the token, batch identifier and device specific secret (if present) may all be configured in the device by an administrator.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a management node for managing a device operable to join a network, the management node comprising a processor and a memory. The memory contains instructions executable by the processor such that the management node is operable to receive from the device a request to join the network, the request comprising a device specific parameter and a token, generate an authentication parameter from the device specific parameter and the token, and authorise the device to join the network if the authentication parameter fulfils a validity criterion. Generating an authentication parameter from the device specific parameter and the token comprises generating an input comprising the device specific parameter and the token, computing a cryptographic function of the generated input, and setting an output of the cryptographic function as the authentication parameter.

According to examples of the present disclosure, the management node may be further operable to carry out a method according to any one of the preceding aspects or examples of the present disclosure.

According to another aspect of the present disclosure, there is provided a management node for managing a device operable to join a network. The management node is adapted to receive from the device a request to join the network, the request comprising a device specific parameter and a token, generate an authentication parameter from the device specific parameter and the token, and authorise the device to join the network if the authentication parameter fulfils a validity criterion. Generating an authentication parameter from the device specific parameter and the token comprises generating an input comprising the device specific parameter and the token, computing a cryptographic function of the generated input, and setting an output of the cryptographic function as the authentication parameter.

According to examples of the present disclosure, the management node may be further adapted to carry out a method according to any one of the preceding aspects or examples of the present disclosure.

According to another aspect of the present disclosure, there is provided a device operable to join a network, the device comprising a processor and a memory. The memory contains instructions executable by the processor such that the device is operable to retrieve a token from a memory, generate a message requesting to join the network, the message comprising a device specific parameter and the token, and send the message to a management node reachable via the network. The token comprises a solution to a cryptographic puzzle such that when combined with at least the device specific parameter and input to a cryptographic function, the token causes the cryptographic function to generate an authentication parameter satisfying a validity criterion.

According to examples of the present disclosure, the device may be further operable to carry out a method according to any one of the preceding aspects or examples of the present disclosure.

According to another aspect of the present disclosure, there is provided a device operable to join a network. The device is adapted to retrieve a token from a memory, generate a message requesting to join the network, the message comprising a device specific parameter and the token, and send the message to a management node reachable via the network. The token comprises a solution to a cryptographic puzzle such that when combined with at least the device specific parameter and input to a cryptographic function, the token causes the cryptographic function to generate an authentication parameter satisfying a validity criterion.

According to examples of the present disclosure, the device may be further adapted to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide methods for managing and operating a device that enable an authentication process that is less onerous and time consuming to configure in the management node than existing processes. According to examples of the present disclosure, a token is configured into devices which may seek to join a network. The token, when combined in some way with at least one device specific parameter (such as device identifier, device capabilities etc.) and input to a cryptographic function, produces an output which may be checked against a validity criterion to determine whether or not the device should be allowed to join the network. The validity criterion may comprise some required value for characters in specified positions of the generated authentication parameter. The token may be considered to be a solution to a cryptographic puzzle, the puzzle begin to identify a token such that, when combined with at least the device specific parameter and input to a cryptographic function, the token causes the cryptographic function to generate an authentication parameter satisfying a validity criterion.

Figure 1:
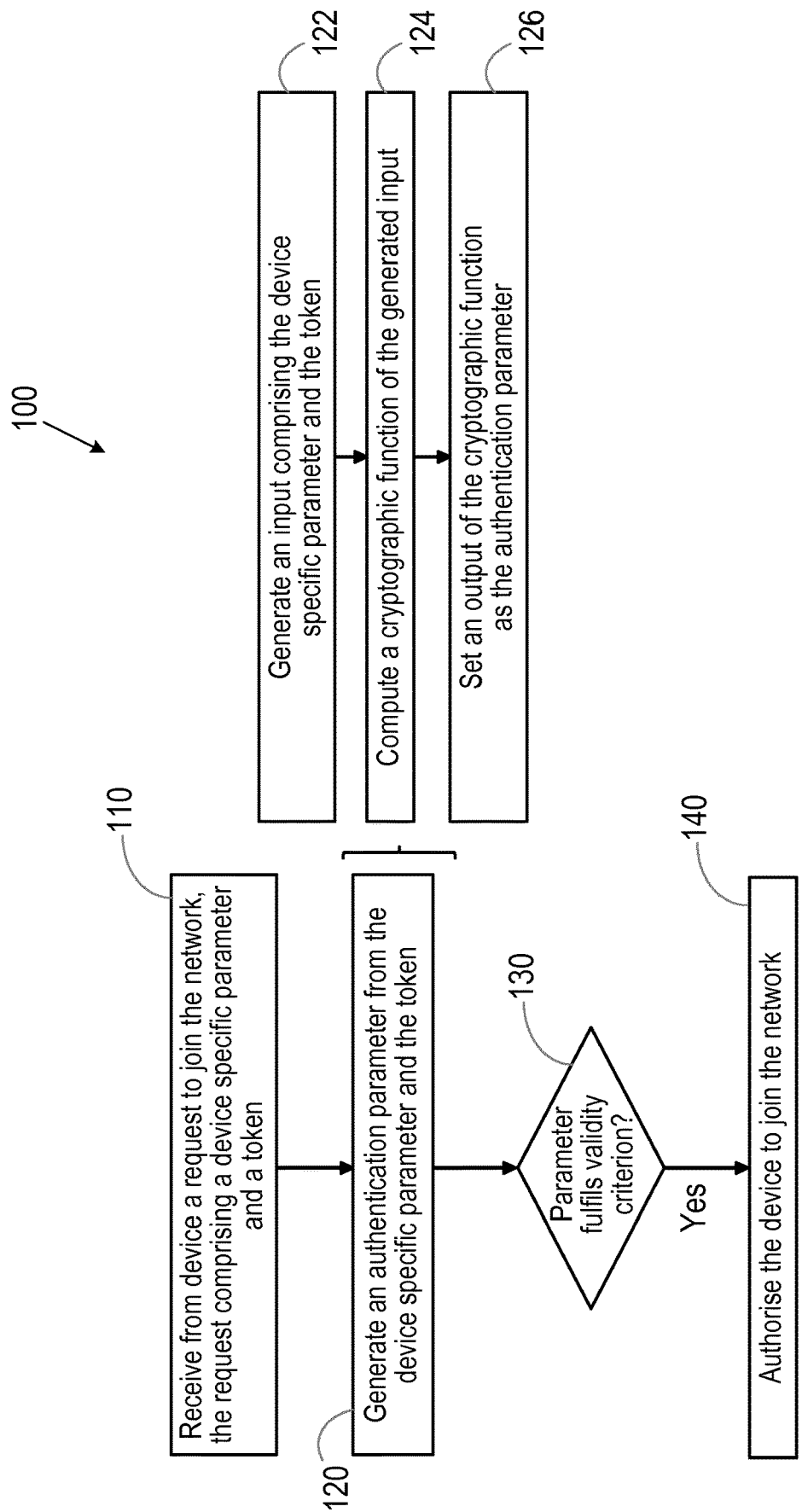
FIG. 1 is a flow chart illustrating process steps in a method for managing a device.

FIG. 1 is a flow chart illustrating process steps in a method 100 for managing a device that is operable to join a network in accordance with aspects of the present disclosure. The method may be carried out by a management node such as an IoT server, the network may comprise an IoT system and the device may be a constrained device as set out above. Referring to FIG. 1, in a first step 110, the method comprises receiving from the device a request to join the network, the request comprising a device specific parameter and a token. The method then comprises, at step 120, generating an authentication parameter from the device specific parameter and the token. As illustrated in step 122, the step of generating an authentication parameter first comprises generating an input comprising the device specific parameter and the token. Generating an authentication parameter then comprises computing a cryptographic function of the generated input at step 1247 and setting an output of the cryptographic function as the authentication parameter in step 126. The method further comprises authorising the device to join the network at step 140, if the authentication parameter is found to fulfil a validity criterion at step 130. It will be appreciated that in order to carry out the above method, a management device may be configured simply with an identification of the cryptographic function to be used and the validity criterion. These parameters may be common to all devices which may seek to join the network. Thus, in contrast to existing methods according to which public keys of all devices must be configured into a management node performing an authorisation process, according to examples of the present disclosure, a management node may be configured for authorising of a large number of devices using only two configuration parameters. An administrator seeking to configure new devices, or a new batch of devices to join a network may not need to make any changes to the configuration of a management node for the network, simply configuring the appropriate token into each device to join the network, as discussed in further detail below.

Figure 2:
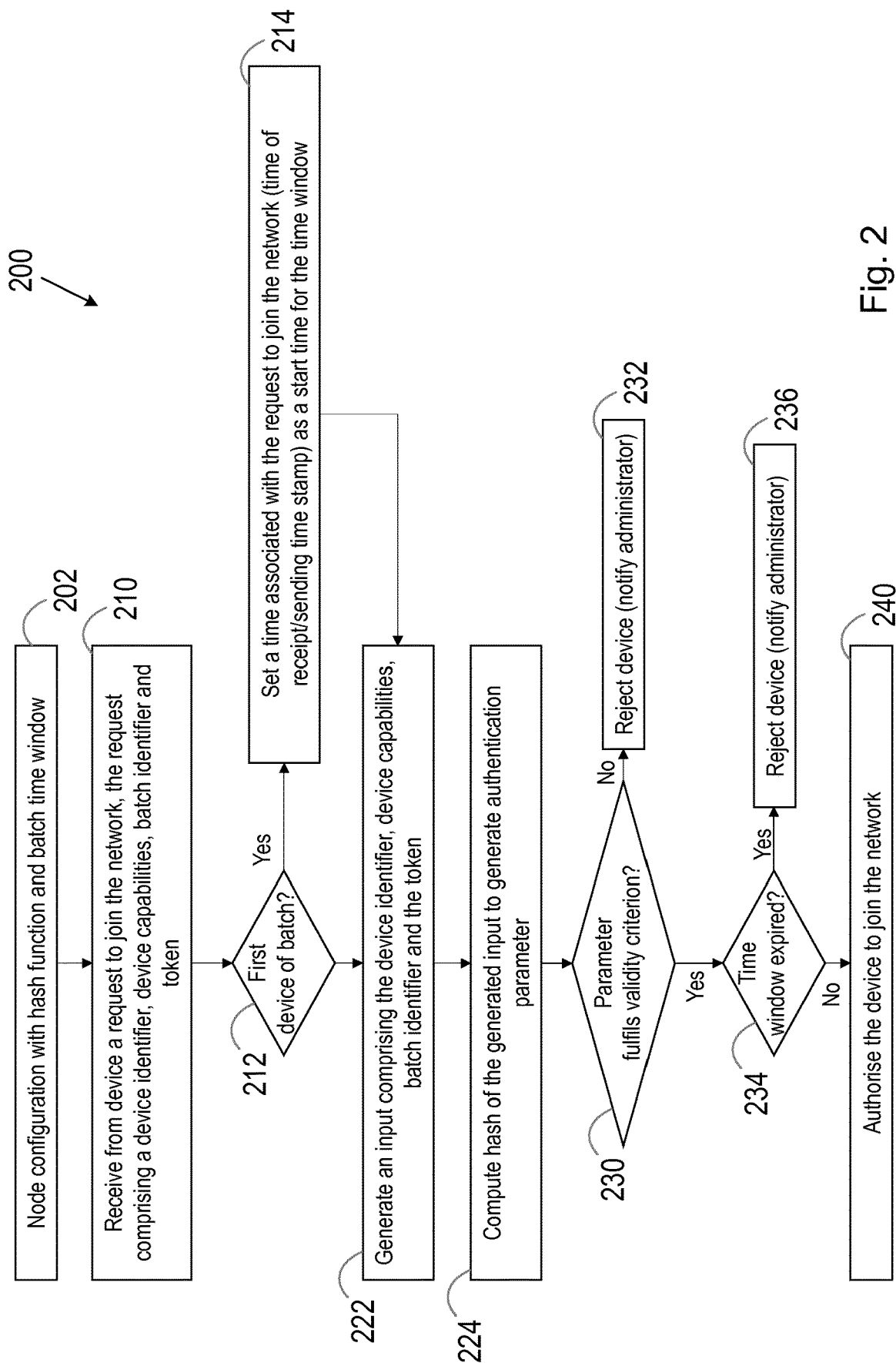
FIG. 2 is a flow chart illustrating process steps in another example of method for managing a device.
Figure 3:
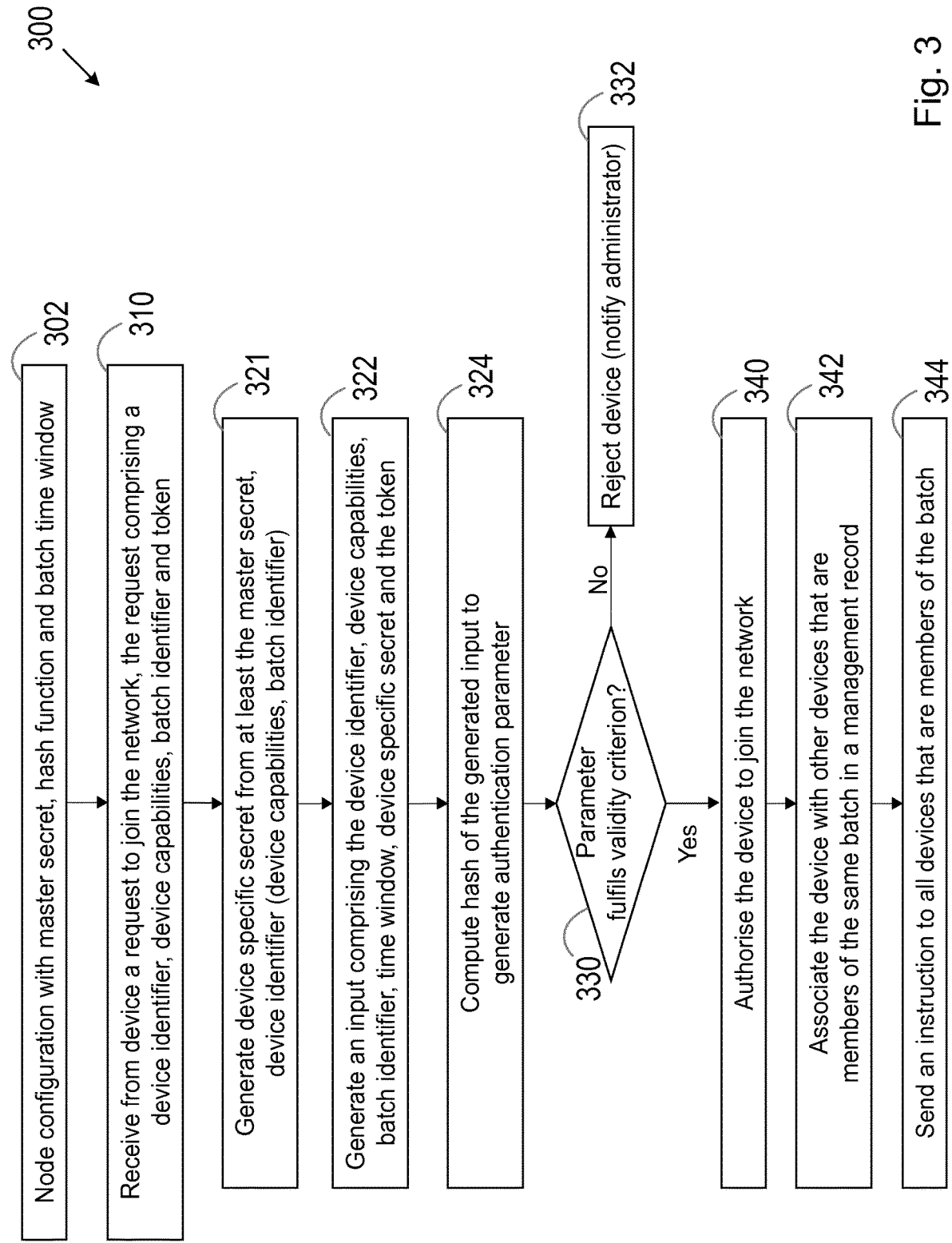
FIG. 3 is a flow chart illustrating process steps in another example of method for managing a device.
Figure 4:
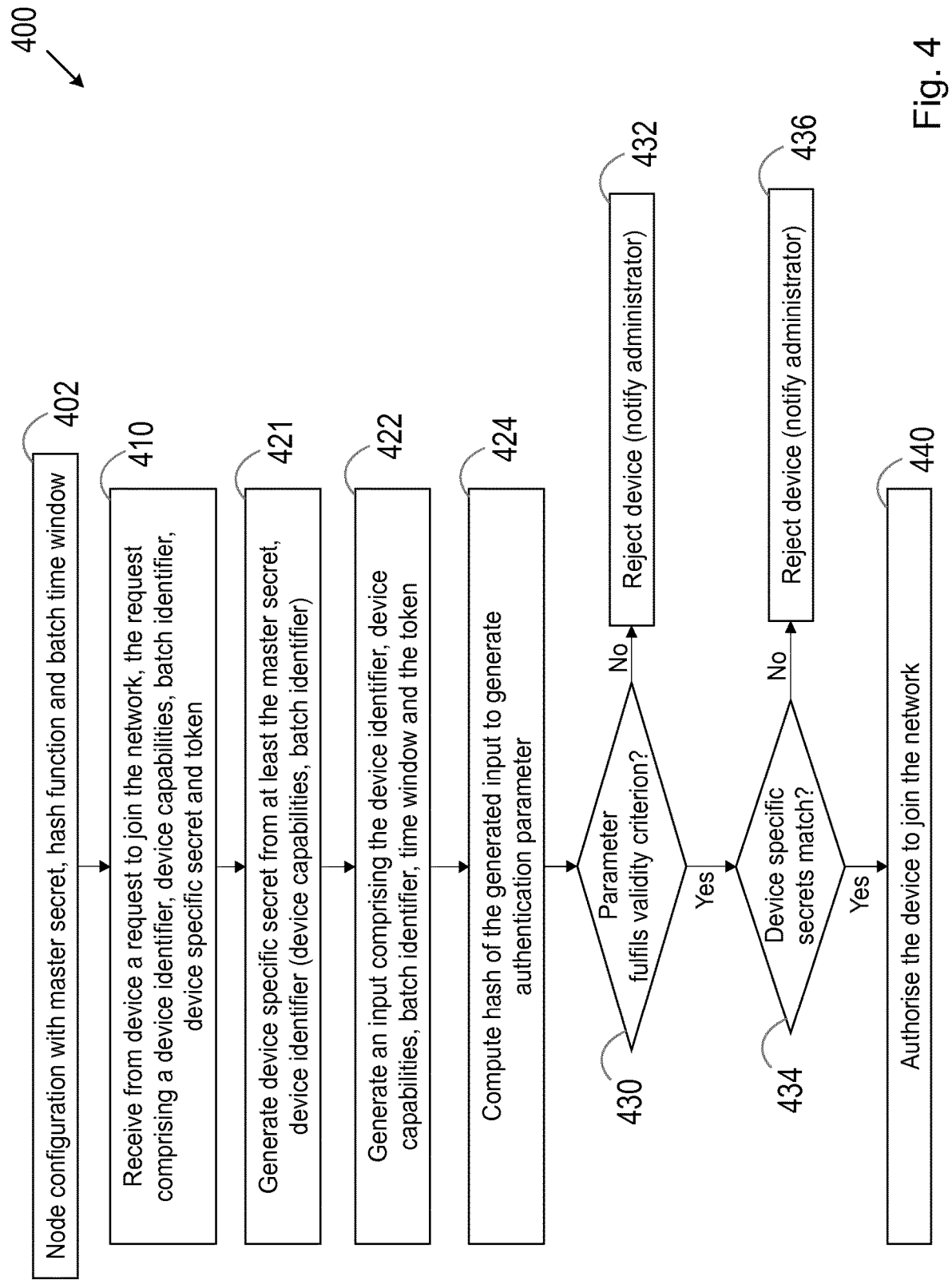
FIG. 4 is a flow chart illustrating process steps in another example of method for managing a device.

According to examples of the present disclosure, a variety of additional parameters may be included in the request to join the network, and may be used in different ways by the management node. FIGS. 2, 3 and 4 are a flow charts illustrating process steps in further examples of methods 200, 300 and 400 for managing a device that is operable to connect to a network in accordance with aspects of the present disclosure. The steps of the methods 200, 300 and 400 illustrate different ways in which the steps of the method 100 may be implemented and supplemented in order to achieve the above discussed and additional functionality. It will be appreciated that the feature combinations of methods 200, 300 and 400 are merely for the purposes of illustration, and other combinations of parameters, and uses of those parameters by the management node, may be envisaged. As for the method of FIG. 1 above, the methods 200, 300 and 400 of FIGS. 2 to 4 may be carried out by a management node such as an IoT server, the network may comprise an IoT system and the device may be a constrained device as set out above.

Referring initially to FIG. 2, according to the example method 200, the management node is first configured with a hash function and a batch time window. A hash function is one example of a cryptographic function which may be used as part of the methods of the present disclosure. A wide range of cryptographic hash functions have been developed, with popular examples including MD5, SHA-1 and SHA-256. It will be appreciated that these are merely examples, and other cryptographic hash functions or other cryptographic functions may be used according to different examples of the present disclosure.

The batch time window may comprise a time window within which a batch of devices is expected to seek to join the network. In IoT systems in particular, it is known for a batch of devices be deployed into the field together. Such devices are likely to seek to join the IoT system within a particular window of time. In many cases, the devices will seek to join the IoT system immediately on deployment into the field. In some cases, a delay may be imposed between deployment and devices seeking to join the system, this delay may be configured into the devices, or may be imposed, for example owing to limitations of the operating environment or other constraints. In a majority of cases, the delay will be common to all devices in the match, meaning that the concept of a time window within which the batch of devices may be expected to seek to join the system remains valid. In some examples the time window may be expressed as a fixed period of time, for example a time period on a specific date such as between 00:01 and 12:00 on date XX/YY/ZZZZ. In other examples, the time window may be expressed as a rolling period of time, such as a period of 20 minutes, 60 minutes etc. In the example method of FIG. 2, the time window is considered to be a rolling period of time.

Referring again to FIG. 2, in step 210, the management node receives from a device a request to join the network. The request comprises an identifier of the device, device capabilities, a batch identifier of a batch to which the device belongs and a token. The device identifier may comprise MAC address, public key, endpoint name etc. and the device capabilities may comprise a list of device resources, including for example list of IPSO smart objects configured on the device. The token may be considered as a "proof of work", with which the device establishes that an administrator has solved the cryptographic puzzle referred to above by identifying a token which, when combined with the device parameters and input to the hash function configured in the management node, will produce an output satisfying the validity parameter, as discussed in further detail below.

In step 212, the management node checks whether the device from which the message was received is the first device of its batch to request to join the network. If so, the management node sets a time associated with the request as a start time for the time window in step 214. The time associated with the request may be a time of receipt of the request, a time stamp included with the request etc. The time window may be monitored by starting a timer as soon as it is established that the device is the first of its batch to request to join the network, or may be monitored by adding the time window to a time associated with the request to obtain a finish time for the time window and then counting down to the finish time. Other example processes for managing the time window may be envisaged.

Once the time window has been started, or if the device is not the first of its batch to seek to join the network, the management node then generates an input at step 222, the input comprising the device identifier, the device capabilities, the batch identifier and the token. Different methods for generating the input may be envisaged. For a hash function accepting multiple inputs, each parameter to be included in the input may simply be assembled in an appropriate order for inputting to the hash function. For a hash function accepting a single input, the parameters may be combined, for example they may be concatenated in some way, or part or all of one parameter may be inserted into another parameter etc. In step 224, the management node computes a hash of the generated input, using the hash function configured into the node at step 202, and sets the output of the computed hash function to be an authentication parameter for the device.

In step 230, the management node checks whether the generated authentication parameter fulfils a validity criterion. As discussed above, the validity criterion may comprise required value for characters in specified positions of the generated authentication parameter. According to examples of the present disclosure, the required value may comprise zero, and the specified positions of the generated authentication parameter may comprise for example the X least significant bits, X most significant bits (where X may be any number up to and including all bits in the authentication parameter), every second bit etc. If the authentication parameter does not fulfil the validity criterion, then the management node rejects the device at step 232. This may comprise sending a reject message to the device and may additionally comprise sending a notification to an administrator. The notification may alert an administrator to a potential attack by a third party, allowing for further investigation.

If the authentication parameter fulfils the validity criterion, then the management node checks at step 234 whether the time window for the batch to which the device belongs has expired. If the time window has expired, then the management node rejects the device at step 236, and may notify an administrator as in step 232. If the time window has not expired, the management node authorises he device to join the network at step 240, for example by sending an authorisation message. It will be appreciated hat the time window check in step 234 prides an additional layer of security. If a device having a valid authentication parameter seeks to join the network outside the expected time window, this represents an anomaly that it may be appropriate to investigate. In some examples the device may simply have experienced an unexpected delay before being able to send a request message. In other examples, an attacker may have succeeded in solving the cryptographic puzzle of identifying a token that will produce a valid authentication parameter, and the time window may thus serve to prevent such an attacker succeeding in joining the network. In some examples, the time window may therefore be selected to reflect an expected time a potential attacker would require to determine a token that would produce a valid authentication parameter on the basis of the cryptographic function and at least a device specific parameter. In some examples, the time window may be system wide parameter or otherwise obtained out of band.

As discussed above, FIG. 3 is a flow chart illustrating process steps in another example of method 300 for managing a device that is operable to connect to a network in accordance with aspects of the present disclosure. The steps of the method 300 illustrate another way in which the steps of the method 100 may be implemented and supplemented in order to achieve the above discussed and additional functionality. As for the method of FIG. 1 above, the method 300 FIG. 3 may be carried out by a management node such as an IoT server, the network may comprise an IoT system and the device may be a constrained device as set out above. It will be appreciated that many of the steps occurring in the method 300 of FIG. 3 also occur, in some cases with variations, in the method 200 of FIG. 2. Where a detailed discussion of implementation and alternatives for a particular step has already been provided in the context of the method 200 of FIG. 2, that discussion is not repeated in the following description of the method 300 of FIG. 3. However, it will be appreciated that the details and alternatives discussed above with reference to FIG. 2 apply equally to the equivalent steps and features of the method 300 of FIG. 3.

Referring to FIG. 3, according to the example method 300, the management node is first configured with a master secret, a hash function and a batch time window. In the example method 300 of FIG. 3, the batch time window is considered to be expressed as a fixed period of time, for example a time period on a specific date such as between 00:01 and 12:00 on date XX/YY/ZZZZ. The batch time window may be represented in any appropriate format.

In step 310, the management node receives from a device a request to join the network. The request comprises an identifier of the device, device capabilities, a batch identifier of a batch to which the device belongs and a token. In step 321, the management node then generates a device specific secret from at least the master secret and the device identifier. The management node may also use the device capabilities and/or batch identifier in the generation of the device specific secret. Different processes may be used to generate the device specific secret. In one example, all information to be used in its generation may be concatenated and a secure hash may be calculated over the concatenated information. An advantage of using a secure hash is that it is a one way function, meaning that the master secret cannot practically be obtained by a third party that may obtain a device specific secret, for example by intercepting a request message including a device specific secret (as illustrated in method 400 below).

After generating the device specific secret, the management node then generates an input at step 322, the input comprising the device identifier, the device capabilities, the batch identifier, the time window, the device specific secret and the token. Different methods for generating the input may be envisaged, as discussed above. In step 324, the management node computes a hash of the generated input, using the hash function configured into the node at step 302, and sets the output of the computed hash function to be an authentication parameter for the device.

In step 330, the management node checks whether the generated authentication parameter fulfils a validity criterion. As discussed above, the validity criterion may comprise required value for characters in specified positions of the generated authentication parameter. If the authentication parameter does not fulfil the validity criterion, then the management node rejects the device at step 332. If the authentication parameter fulfils the validity criterion, then the management node authorises he device to join the network at step 340, for example by sending an authorisation message. In step 342, the management node then associates the device with other devices that are members of the same batch in a management record, and the management node then sends an instruction to all devices that are members of the batch in step 344. Steps 342 and 344 represent one example of how batch identification may be used to manage devices on a batch basis. Other example management operations may be performed on a batch basis, including observing resources, setting trust levels etc. It will be appreciated that, although not specifically illustrated, management operations on a batch basis may also be performed following authorisation of devices according to examples of the method 100, 200, or 400.

It will be appreciated that the methods 200 and 300 demonstrate two alternative ways in which a time window associated with a batch of devices may be used to enhance security of an authorisation process. In the method 200, the time window is used as an additional check following a check of an authentication parameter against a validity criterion. This may be appropriate for batches for which a fixed time window may not be available, for example if a deployment time is not known, or a delay between deployment and seeking to join the network is expected (such as in particularly constrained operating environments). In the method 300, the time window is included in the generation of the authentication parameter, meaning the parameter will only fulfil the validity criterion if the request is received within the appropriate time window, in addition to the token and other parameters from which the input is generated begin correct. This has the advantage of including an extra time window associated level of security without requiring an additional check to be performed by the management node. This may be appropriate for batches for which a fixed time window is known.

As discussed above, FIG. 4 is a flow chart illustrating process steps in another example of method 400 for managing a device that is operable to connect to a network in accordance with aspects of the present disclosure. The steps of the method 400 illustrate another way in which the steps of the method 100 may be implemented and supplemented in order to achieve the above discussed and additional functionality. As for the method of FIG. 1 above, the method 400 FIG. 4 may be carried out by a management node such as an IoT server, the network may comprise an IoT system and the device may be a constrained device as set out above. It will be appreciated that many of the steps occurring in the method 400 of FIG. 4 also occur, in some cases with variations, in the method 200 of FIG. 2 and/or the method 300 of FIG. 3. Where a detailed discussion of implementation and alternatives for a particular step has already been provided in the context of the method 200 of FIG. 2 or 300 of FIG. 3, that discussion is not repeated in the following description of the method 400 of FIG. 4. However, it will be appreciated that the details and alternatives discussed above with reference to FIGS. 2 and 3 apply equally to the equivalent steps and features of the method 400 of FIG. 4.

Referring to FIG. 4, according to the example method 400, the management node is first configured with a master secret, a hash function and a batch time window. In the example method 400 of FIG. 4, the batch time window is considered to be expressed as a fixed period of time, for example a time period on a specific date such as between 00:01 and 12:00 on date XX/YY/ZZZZ. The batch time window may be represented in any appropriate format.

In step 410, the management node receives from a device a request to join the network. The request comprises an identifier of the device, device capabilities, a batch identifier of a batch to which the device belongs, a device specific secret and a token. In step 421, the management node then generates a device specific secret from at least the master secret and the device identifier. The management node may also use the device capabilities and batch identifier in the generation of the device specific secret as discussed above.

After generating the device specific secret, the management node then generates an input at step 422, the input comprising the device identifier, the device capabilities, the batch identifier, the time window and the token. Different methods for generating the input may be envisaged, as discussed above. In step 424, the management node computes a hash of the generated input, using the hash function configured into the node at step 402, and sets the output of the computed hash function to be an authentication parameter for the device.

In step 430, the management node checks whether the generated authentication parameter fulfils a validity criterion. As discussed above, the validity criterion may comprise required value for characters in specified positions of the generated authentication parameter. If the authentication parameter does not fulfil the validity criterion, then the management node rejects the device at step 432. If the authentication parameter fulfils the validity criterion, then the management node proceeds to compare, in step 434, the device specific secret generated at step 421 with the device specific secret received from the device in the request message at step 410. If the generated and received device specific secrets do not match, the management node rejects the device at step 436. If the generated and received device specific secrets match, then the management node authorises he device to join the network at step 440, for example by sending an authorisation message.

It will be appreciated that the methods 300 and 400 demonstrate two alternative ways in which a device specific secret may be used to enhance security of an authorisation process. In the method 400, the device specific secret is both generated in the management node and received from the device, and the device specific secrets are then used as an additional check following a check of an authentication parameter against a validity criterion. In the method 300, the device specific secret is included in the generation of the authentication parameter, meaning the parameter will only fulfil the validity criterion if the device specific secret is valid, in addition to the token and other parameters from which the input is generated being correct.

Figure 5:
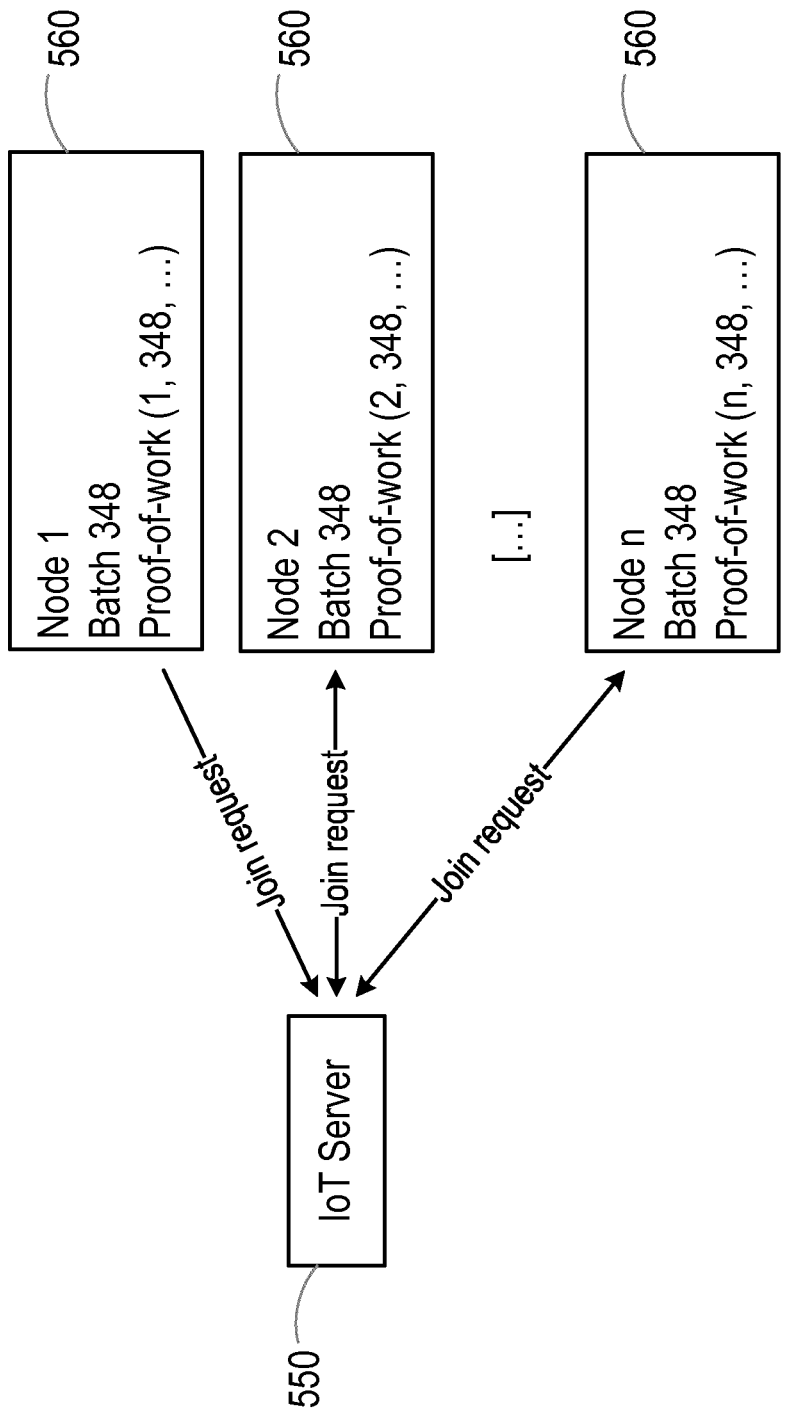
FIG. 5 is a schematic representation of an implementation of the method of FIG. 1.

FIG. 5 is a schematic illustration of an implementation of the methods 100, 200, 300, 400, with a plurality of devices 560 seeking to join an IoT system by sending Join Request messages to an IoT server 550. The join request messages include node identifiers, batch identifiers and token. The token is illustrated as a "proof of work" which may encapsulate the token and additional device parameters as illustrated.

FIGS. 1 to 5 thus illustrate examples of how a management node may manage devices seeking to join a network such as an IoT system, using a token supplied by the device and other device parameter or parameters to generate an input to a cryptographic function, and checking the output of that function against a validity criterion. It will be appreciated that the token may be device specific, as the token is such that the cryptographic function performed over an input generated from the token and one or more device specific parameters results in an output that satisfies a validity criterion. Depending upon the cryptographic function used, and the degree of commonality between device parameters, it is highly unlikely that a token for any one device would also result in a valid authentication parameter if used for a different device, having a different identifier and parameters.

Figure 6:
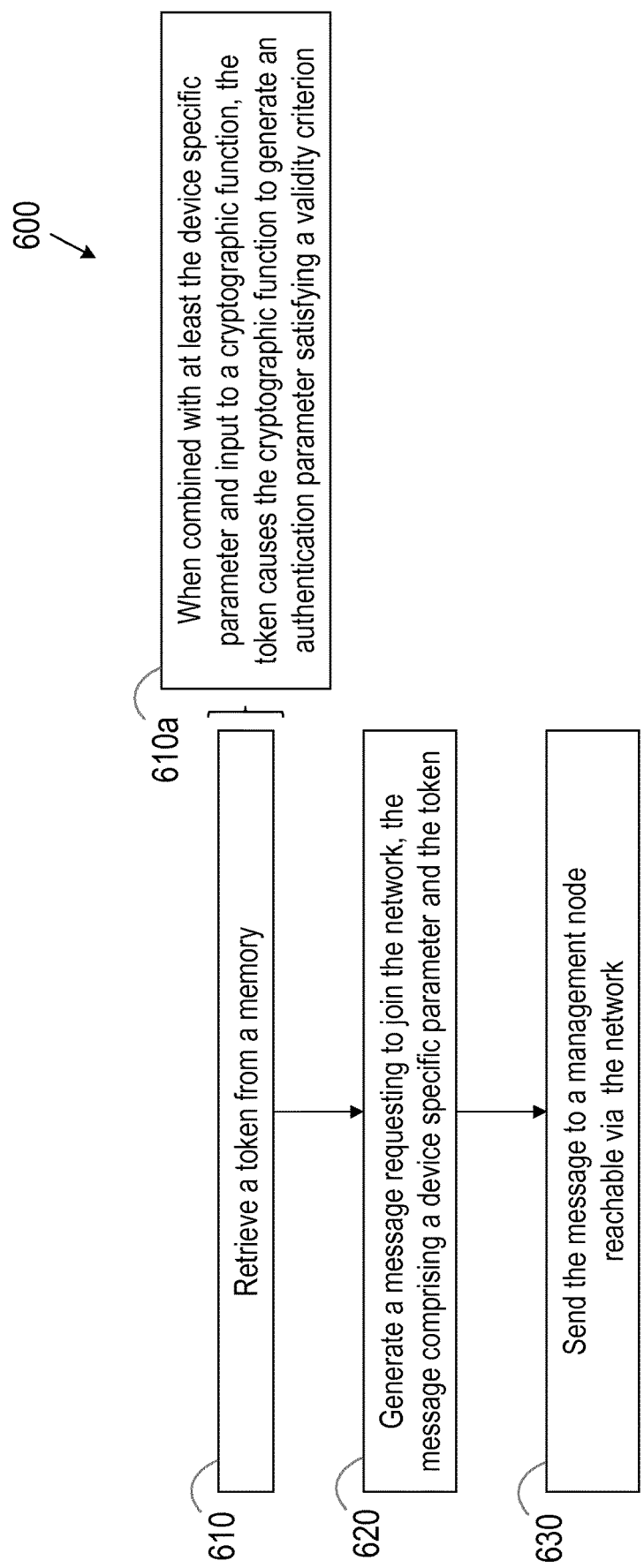
FIG. 6 is a is a flow chart illustrating process steps in a method for operating a device.

FIG. 6 is a flow chart illustrating process steps in a method 600 for operating a device that is operable to join a network in accordance with aspects of the present disclosure. The method may be carried out by the device, which may be a constrained device as set out above. The management node to which the device sends a message an IoT server, and the network may comprise an IoT system. Referring to FIG. 6, the method comprises, in a first step 610 retrieving a token from a memory. The method then comprises generating a message requesting to join the network in step 620, the message comprising a device specific parameter and the token. The method then comprises, in step 630, sending the message to a management node reachable via the network. As illustrated in step 610a, the token is such that, when combined with at least the device specific parameter and input to a cryptographic function, the token causes the cryptographic function to generate an authentication parameter satisfying a validity criterion.

Figure 7:
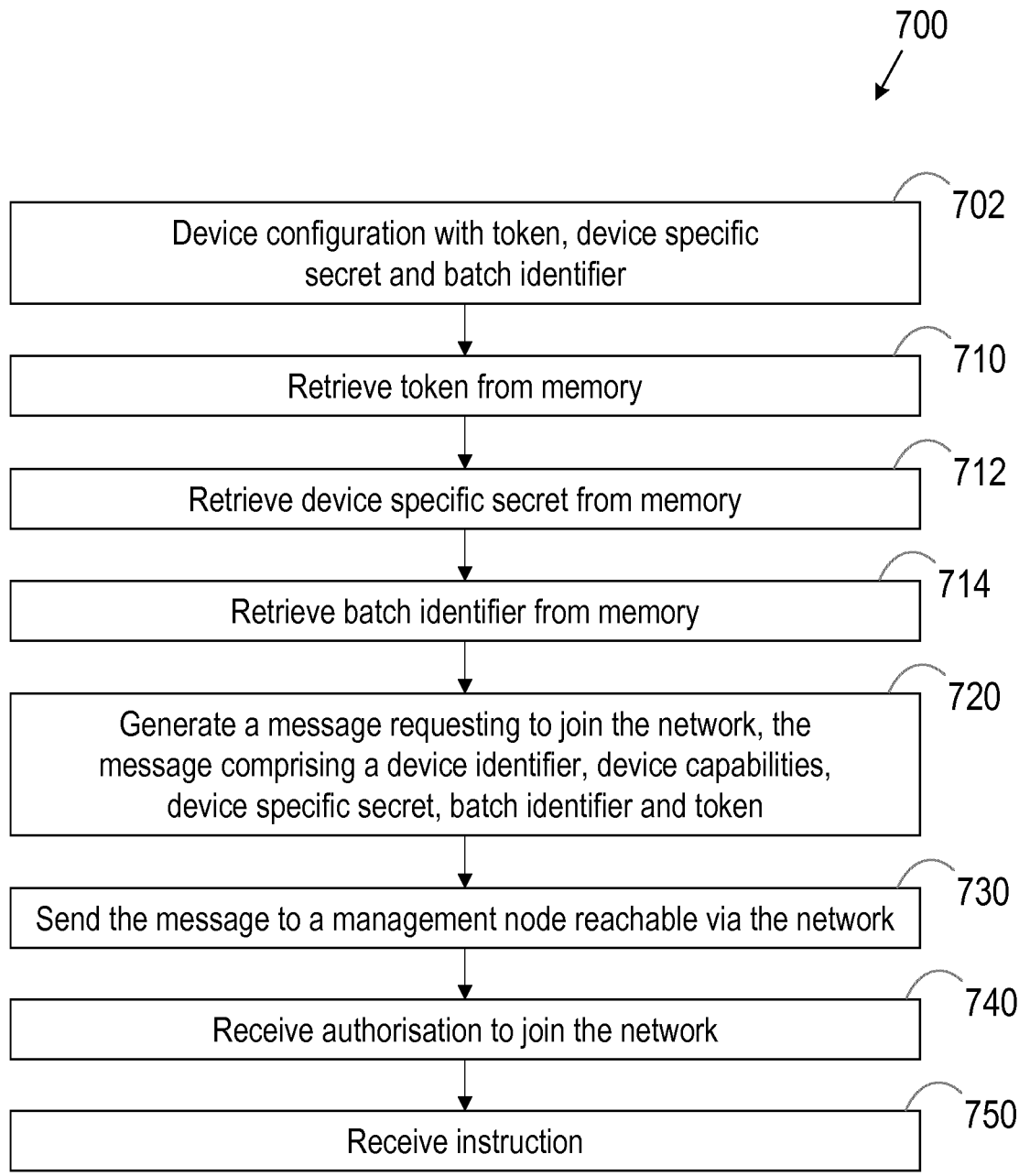
FIG. 7 is a flow chart illustrating process steps in another example of method for operating a device.

FIG. 7 is a flow chart illustrating process steps in another example of method 700 for operating a device that is operable to connect to a network in accordance with aspects of the present disclosure. The steps of the method 700 illustrate one way in which the steps of the method 600 may be implemented and supplemented in order to achieve the above discussed and additional functionality. As for the method of FIG. 6 above, the method 700 FIG. 7 may be carried out by the device, which may be a constrained device as set out above. The management node to which the device sends a message an IoT server, and the network may comprise an IoT system.

Referring to FIG. 7, in a first step 702, the device is configured with a token, a device specific secret and a batch identifier. As discussed above, the token is such that, when combined with at least the device specific parameter and input to a cryptographic function, the token causes the cryptographic function to generate an authentication parameter satisfying a validity criterion. In practice, in order to generate the token, an administrator configuring the device may perform a brute force attack against the cryptographic puzzle trialling different tokens until a token is found that results in an output from the cryptographic function that satisfies the validity criterion. As discussed above with respect to the methods 100, 200, 300, 400, the cryptographic function may be a hash function, and the validity criterion may be a required value for certain digits in the output of the hash function, such as a zero in specific positions of the output. The difficulty of the cryptographic puzzle to which the token is the solution may be regulated by selection of the cryptographic function, setting the number of positions at which a specific value is required in order to satisfy the validity criterion, varying the number of parameters used to generate the input to the cryptographic function etc. It will be appreciated that administrators configuring a device and a management node may ensure that the logic used to create the token configured in the device is the same as that which is configured on the management node (how to generate the input and from what information, what cryptographic function to use, what the validity criterion is and if appropriate, how to generate the device specific secret).

In step 710, the device retrieves the token with which it has been configured from a memory and, in steps 712 and 714, the device retrieves the device specific secret and batch identifier from a memory. The device then generates a message requesting to join the network at step 720. The message comprises a device identifier, device capabilities, the device specific secret, the batch identifier and the token. In step 730 the device sends the generated request message to a management node reachable via the network, and in step 730 the device receives authorisation to join the network. In step 750, the device receive an instruction.

It will be appreciated that the steps of the methods 600 and 700 compliment those of the methods 100, 200, 300, 400, such that the information to be used by a management node in authorising a device is provided in the request message.

Figure 8:
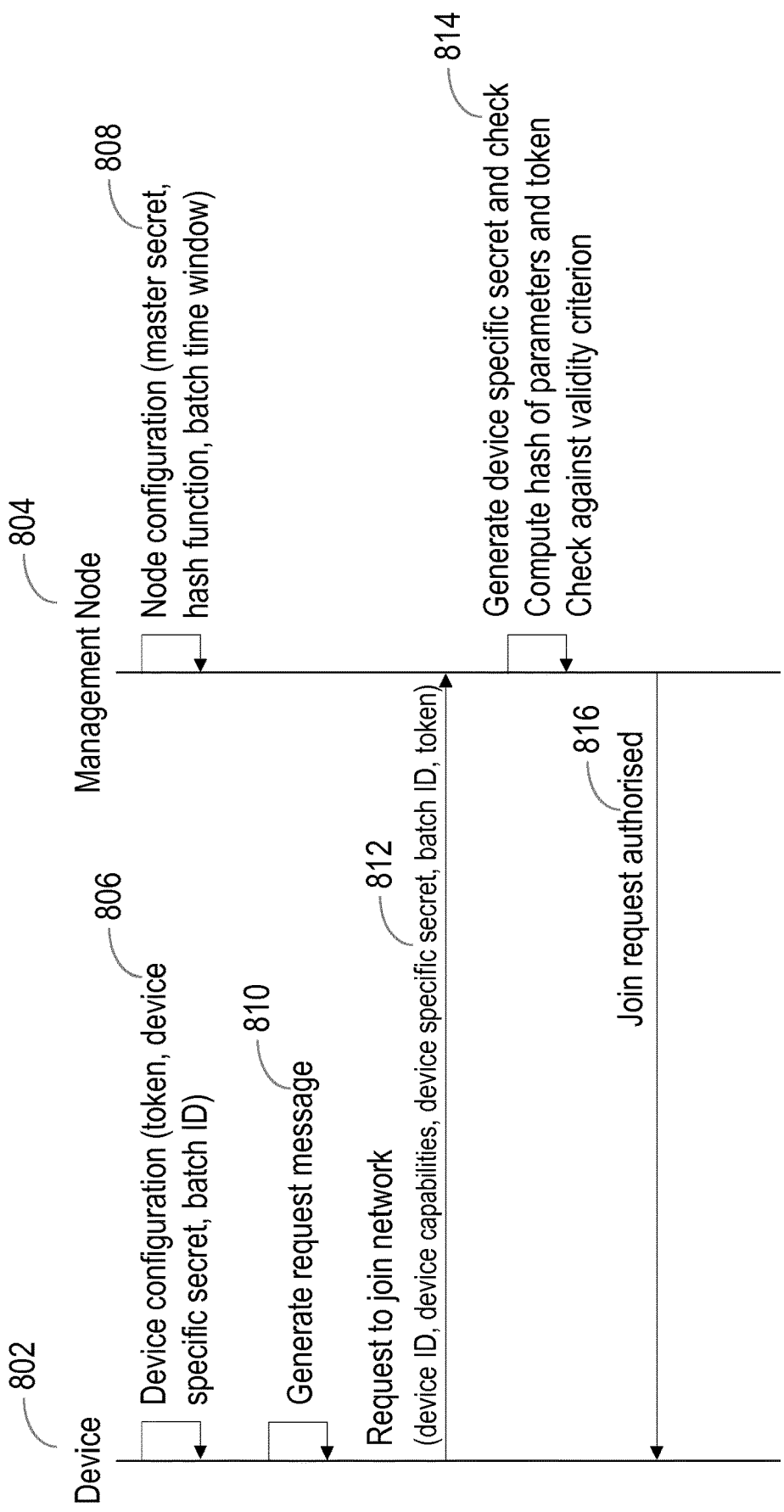
FIG. 8 is a signalling diagram illustrating an implementation of the methods of FIGS. 1 and 6.

FIG. 8 is a message flow diagram illustrating message exchange between a device 802 seeking to join a network and management node 804 according to examples of the present disclosure. Referring to FIG. 8, the device 802 and management node 804 are first configured with appropriate information in configuration steps 806, 808. The appropriate information may include for example a token, deice specific secret and batch identifier for the deice, and a master secret, hash or other cryptographic function, validity criterion and batch time window for the management node. The device then generates a request message at step 810 and sends the message, including appropriate parameters in the step 812. At 814, the management node performs authorisation of the device, for example by generating a device specific secret and checking the generated device specific secret against that received from the deice, computing the configured hash function over an input comprising the received token and other deice specific parameters, and checking the output of the hash function against a validity criterion. If the authorisation process is successful, the management node 804 sends an authorisation message to the device 802 in step 816.

Figure 9:
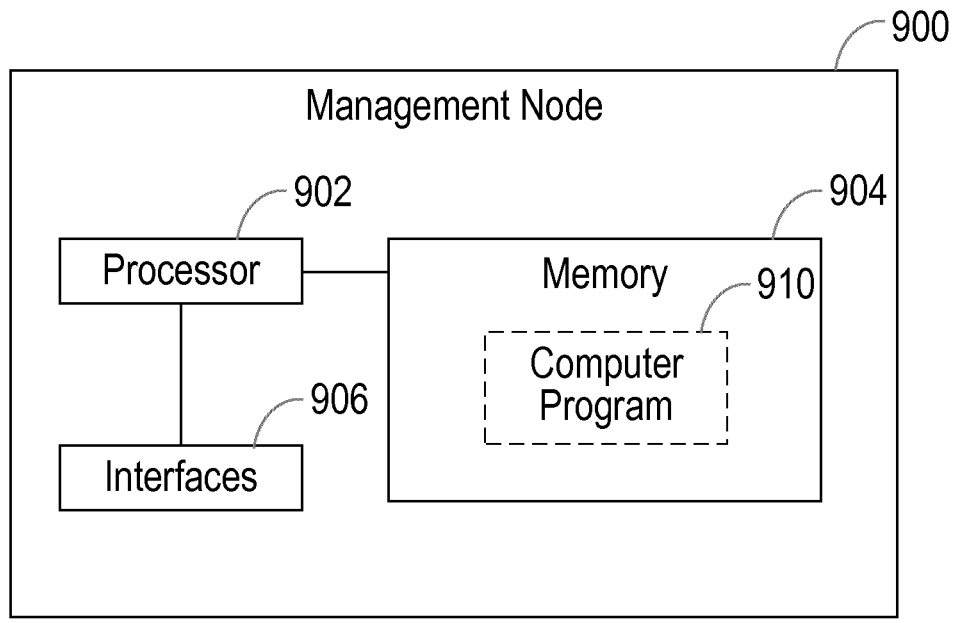
FIG. 9 is a block diagram illustrating functional modules in a management node.

As discussed above, the methods 100, 200, 300, 400 may be performed by a management node, which may in some examples be a server node such as an IoT server. The management node may be a physical node or may be a Virtualised Network Function. FIG. 9 is a block diagram illustrating an example management node 900 which may implement the methods 100, 200, 300, 400 according to examples of the present disclosure, for example on receipt of suitable instructions from a computer program 910. Referring to FIG. 9, the management node 900 comprises a processor or processing circuitry 902, a memory 904 and interfaces 906. The memory 904 contains instructions executable by the processor 902 such that the management node 900 is operative to conduct some or all of the steps of the method 100, 200, 300 and/or 400. The instructions may also include instructions for executing one or more telecommunications and/or data communications protocols. The instructions may be stored in the form of the computer program 910. In some examples, the processor or processing circuitry 902 may include one or more microprocessors or microcontrollers, as well as other digital hardware, which may include digital signal processors (DSPs), special-purpose digital logic, etc. The processor or processing circuitry 902 may be implemented by any type of integrated circuit, such as an Application Specific Integrated Circuit (ASIC), Field Programmable Gate Array (FPGA) etc. The memory 904 may include one or several types of memory suitable for the processor, such as read-only memory (ROM), random-access memory, cache memory, flash memory devices, optical storage devices, solid state disk, hard disk drive etc.

Figure 10:
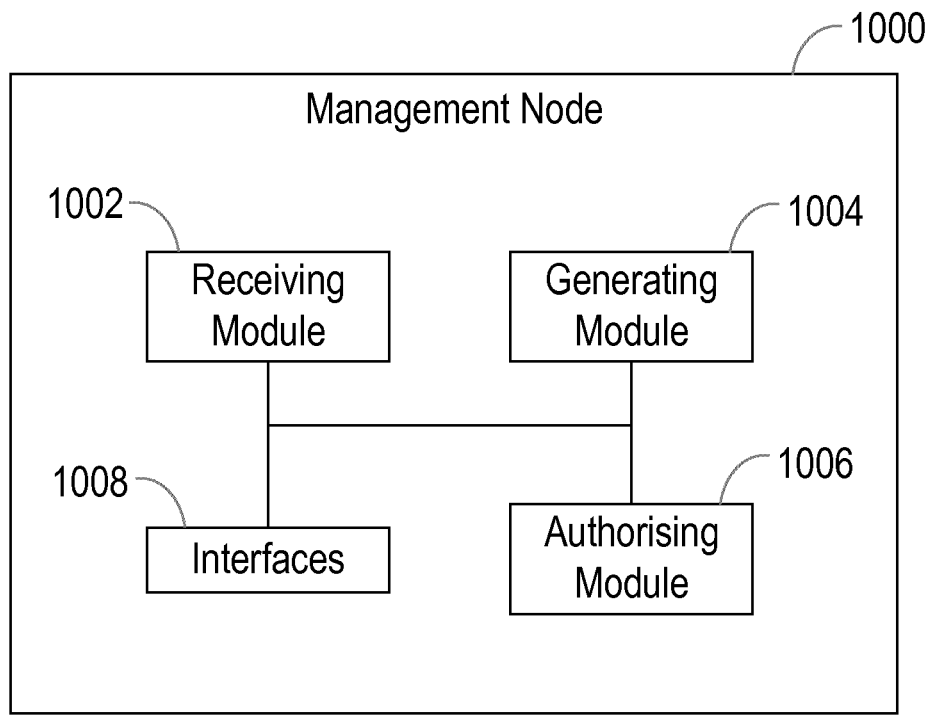
FIG. 10 is a block diagram illustrating functional modules another example of management node.

FIG. 10 illustrates functional units in another example of management node 1000 which may execute examples of the methods 100, 200, 300, 400 of the present disclosure, for example according to computer readable instructions received from a computer program. It will be understood that the units illustrated in FIG. 10 are functional units, and may be realised in any appropriate combination of hardware and/or software. The units may comprise one or more processors and may be integrated to any degree.

Referring to FIG. 10, the management node 1000 comprises a receiving module 1002 for receiving from a device a request to join the network, the request comprising a device specific parameter and a token. The management node further comprises a generating module 1004 for generating an authentication parameter from the device specific parameter and the token. The generating module 1004 generates an authentication parameter from the device specific parameters and the token by generating an input comprising the device specific parameter and the token, computing a cryptographic function of the generated input, and setting an output of the cryptographic function as the authentication parameter. The management node further comprises an authorising module 1006 for authorising the device to join the network if the authentication parameter fulfils a validity criterion. The management node 1000 also comprises interfaces 1008. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Figure 11:
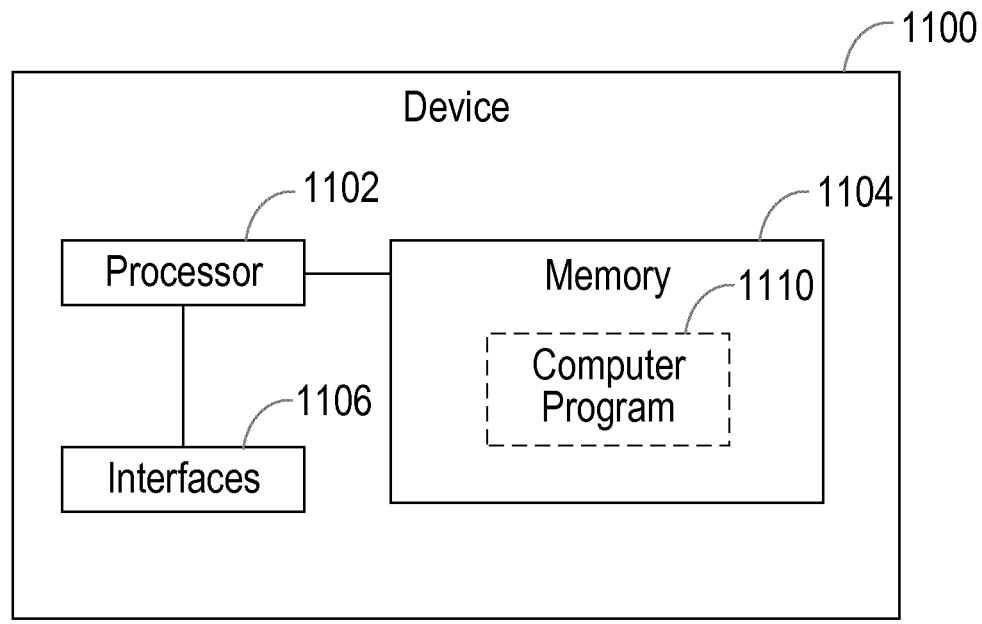
FIG. 11 is a block diagram illustrating functional modules in a device.

Also as discussed above, the methods 600, 700 may be performed by a device, which may in some examples be a constrained device. FIG. 11 is a block diagram illustrating an example device 1100 which may implement the methods 600, 700 according to examples of the present disclosure, for example on receipt of suitable instructions from a computer program 1110. Referring to FIG. 11, the device 1100 comprises a processor or processing circuitry 1102, a memory 1004 and interfaces 1106. The memory 1104 contains instructions executable by the processor 1102 such that the device 1100 is operative to conduct some or all of the steps of the method 600 and/or 700. The instructions may also include instructions for executing one or more telecommunications and/or data communications protocols. The instructions may be stored in the form of the computer program 1110. In some examples, the processor or processing circuitry 1102 may include one or more microprocessors or microcontrollers, as well as other digital hardware, which may include digital signal processors (DSPs), special-purpose digital logic, etc. The processor or processing circuitry 1102 may be implemented by any type of integrated circuit, such as an Application Specific Integrated Circuit (ASIC), Field Programmable Gate Array (FPGA) etc. The memory 1104 may include one or several types of memory suitable for the processor, such as read-only memory (ROM), random-access memory, cache memory, flash memory devices, optical storage devices, solid state disk, hard disk drive etc.

Figure 12:
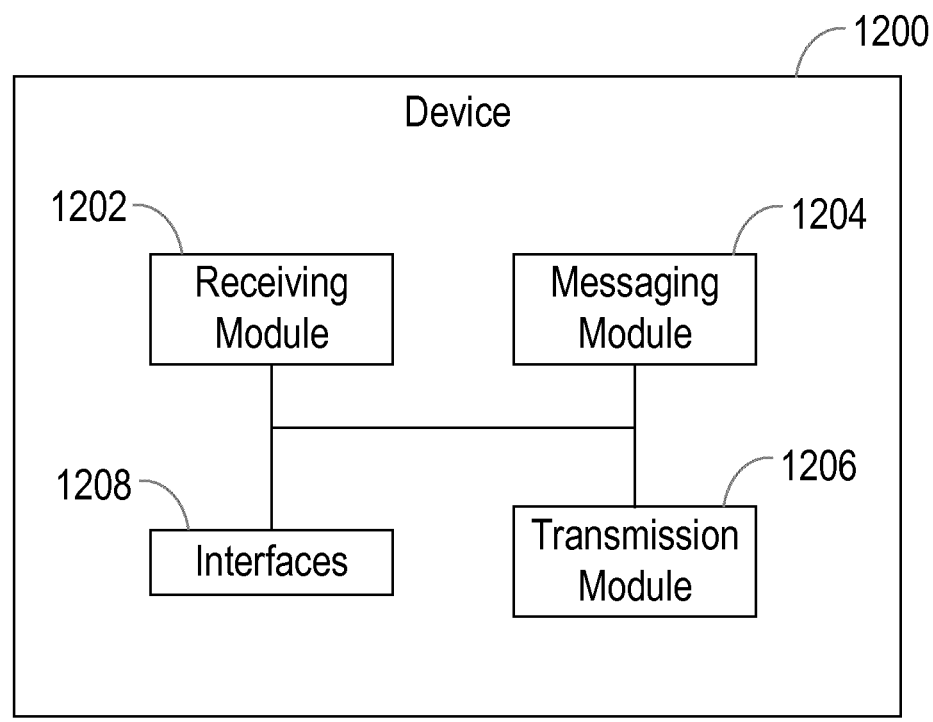
FIG. 12 is a block diagram illustrating functional modules in another example of device.

FIG. 12 illustrates functional units in another example of device 1200 which may execute examples of the methods 600, 700 of the present disclosure, for example according to computer readable instructions received from a computer program. It will be understood that the units illustrated in FIG. 12 are functional units, and may be realised in any appropriate combination of hardware and/or software. The units may comprise one or more processors and may be integrated to any degree.

Referring to FIG. 12, the device 1200 comprises a retrieving module 1202 for retrieving a token from a memory and a message module 1204 for generating a message requesting to join the network, the message comprising a device specific parameter and the token. The device 1200 further comprises a transmission module 1206 for sending the message to a management node reachable via the network. The token is such that, when combined with at least the device specific parameter and input to a cryptographic function, the token causes the cryptographic function to generate an authentication parameter satisfying a validity criterion. The device also comprises interfaces 1208. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Aspects of the present disclosure provide methods according to which devices may be authorised to join a network such as an IoT system based on an authentication parameter that is generated from a token provided by a device. The token is the solution to a cryptographic puzzle, and establishes that an administrator has solved the cryptographic puzzle by identifying a token which, when combined with parameters of the device and input to a given cryptographic function, will produce an output satisfying a validity parameter. The difficulty of identifying the token may be adjusted in order to set a desired security level for the network to be joined. A token may be computed in advance by an administrator and configured into a device at the time it will be joining the network. Configuration of a management node to perform authorisation in accordance with methods in the present disclosure is considerably simpler and more convenient than configuration for previously used methods, involving for example configuring of a dedicated piece of information, such as a public key, for each device which may seek to join the network.

Examples of the present disclosure may combine the use of a token with the idea of a batch of devices, such that a device is authorised to join a network on the basis of belonging to the correct batch, and in some examples on the basis of a time window, which may be associated with the batch. Individual devices may prove that they belong to a batch by presenting an appropriate token to a management node such as an IoT server. It will be appreciated that in some networks, such as some IoT systems, a sufficient level of security may be provided by the knowledge, at a management node for the network, that a batch of devices with certain capabilities will wish to join the system at a particular time (that is within a time window). All such devices may then be authorised to join the system. In this manner, the process of authenticating each device individually in order to authorise it to join the system is simplified such that the management node simply establishes that the device belongs to the expected batch and, in some examples, has the expected properties.

Examples of the present disclosure in which batch membership is used for authorisation may be most effective in networks in which new batches of devices are not added to a system too often and in which batches are added one at a time. In such situations, a batch of rogue devices wanting to join the system will be detected by the management node, which does not expect them to be joining at that time. Rogue devices attempting to join a network during a time window in which a batch of legitimate devices is expected to join will also be unable to join since they are not part of the batch. According to examples of the present disclosure, an administrator of a network does not need to configure a network management node in any way when a new batch of devices is expected to join. The administrator simply configures each device in the batch with a suitable token and device parameters. The administrator may additionally set or start a time window within which devices from that batch ID will be authorised to join the network. In some examples, the time window may be short enough so that an attacker would not have time to generate a valid token for a rogue device to join the system during the time window. It will be appreciated that according to examples of the present disclosure, authorisation of a large number of devices into a network such as an IoT system is convenient to run and configure. In addition, compromised device can only be replaced by an attacking device that would have the correct token and same device specific parameters as are used for generation of an authentication parameter.

According to further examples of the present disclosure, the use of a token may be combined with use of a device specific secret, which may in some examples be bound to the capabilities of the device. The device specific secret may be derivable from a master secret and certain device specific parameters. An administrator of a network may configure the master secret in a management node of a network and configure device-specific secrets in new devices without the need to further provision or contact in any way the management node of the network. Devices may not have access to the master secret meaning that even if a device is compromise, it cannot provide information allowing access to the network for additional (rogue) nodes.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing a device operable to join a network, the method, performed by a management node, comprising:
   receiving from the device a request to join the network, the request comprising a device specific parameter and a token;
   generating an authentication parameter from the device specific parameter and the token; and
   authorising the device to join the network if the authentication parameter fulfils a validity criterion,
   wherein generating the authentication parameter from the device specific parameter and the token comprises:
      generating an input comprising the device specific parameter and the token;
      computing a cryptographic function of the generated input; and
      setting an output of the cryptographic function as the authentication parameter, wherein the validity criterion comprises a required value for characters in specified positions of the generated authentication parameter.

2. A method as claimed in claim 1, wherein the cryptographic function comprises a hash function.

3. A method as claimed in claim 1, wherein the device specific parameter comprises at least one of:
   a device identifier;
   a representation of capabilities of the device;
   a representation of device resources.

4. A method as claimed in claim 1, wherein the device is associated with a time window within which the device is expected to join the network, and wherein generating an authentication parameter comprises generating an input comprising the device specific parameter, the token and a representation of the time window, and computing a cryptographic function of the generated input.

5. A method as claimed in claim 1, wherein the device is associated with a time window within which the device is expected to join the network, and wherein the method further comprises authorising the device to join the network if the authentication parameter fulfils a validity criterion and a time associated with the request to join the network falls within the time window.

6. A method as claimed in claim 1, wherein the device is a member of a batch of devices operable to connect to the network; wherein the request to join the network further comprises an identifier of the batch of which the device is a member; and wherein generating an authentication parameter comprises generating an input comprising the device specific parameter, the token and the batch identifier, and computing a cryptographic function of the generated input.

7. A method as claimed in claim 6, wherein the device is associated with a time window within which the device is expected to join the network, and wherein the method further comprises:
   checking whether the device is the first member of its batch to request to join the network; and
   if the device is the first member of its batch to request to join the network, setting a time associated with the request to join the network as a start time for the time window.

8. A method as claimed in claim 6, further comprising:
   associating the device with other devices that are members of the same batch in a management record; and
   sending an instruction to all devices that are members of the batch.

9. A method as claimed in claim 1, the method further comprising:
   generating a device specific secret from at least a master secret and the device specific parameter; and wherein generating an authentication parameter comprises generating an input comprising the device specific parameter, the token and the device specific secret, and computing a cryptographic function of the generated input.

10. A method as claimed in claim 1, wherein the request to join the network further comprises a device specific secret, the method further comprising:
    generating a device specific secret from at least a master secret and the device specific parameter;
    comparing the generated device specific secret to the received device specific secret; and
    authorising the device to join the network if the authentication parameter fulfils a validity criterion and the generated device specific secret is identical to the received device specific secret.

11. A method as claimed in claim 9, wherein generating a device specific secret comprises generating the device specific secret from at least the master secret, the device specific parameter and at least one of:
    a representation of capabilities of the device;
    a representation of device resources;
    an identifier of a batch of devices to which the device belongs.

12. A method as claimed in claim 1, further comprising: rejecting the request from the device if the authentication parameter does not meet the validity criterion.

13. A method for operating a device that is operable to join a network, the method, performed by the device, comprising:
    retrieving a token from a memory;
    generating a message requesting to join the network, the message comprising a device specific parameter and the token; and
    sending the message to a management node reachable via the network,
    wherein when combined with at least the device specific parameter and an input to a cryptographic function, the token causes the cryptographic function to generate an authentication parameter satisfying a validity criterion,
    wherein the validity criterion comprises a required value for characters in specified positions of the generated authentication parameter.

14. A method as claimed in claim 13, wherein the cryptographic function comprises a cryptographic hash function.

15. A method as claimed in claim 13, wherein the device specific parameter comprises at least one of:
    a device identifier;
    a representation of capabilities of the device;
    a representation of device resources.

16. A method as claimed in claim 1, wherein the device is a member of a batch of devices operable to connect to the network; the method further comprising:
    retrieving an identifier of the batch of which the device is a member from a memory;
    and wherein generating a message requesting to join the network comprises generating a message comprising the device specific parameter, the token and the batch identifier.

17. A method as claimed in claim 1, the method further comprising:
    retrieving a device specific secret from a memory;
    and wherein generating a message requesting to join the network comprises generating a message comprising the device specific parameter, the token and the device specific secret.

18. A computer program comprising instructions which, when executed on at least one processor, cause the at least one processor to carry out a method according to claim 1.

19. A computer program product comprising non transitory computer readable media having stored thereon a computer program as claimed in claim 18.

20. A management node for managing a device operable to join a network, the management node comprising a processor and a memory, the memory containing instructions executable by the processor such that the management node is operable to:
    receive from the device a request to join the network, the request comprising a device specific parameter and a token;
    generate an authentication parameter from the device specific parameter and the token; and
    authorise the device to join the network if the authentication parameter fulfils a validity criterion, wherein generating the authentication parameter from the device specific parameter and the token comprises:
generating an input comprising the device specific parameter and the token;
computing a cryptographic function of the generated input; and
setting an output of the cryptographic function as the authentication parameter,
wherein the validity criterion comprises a required value for characters in specified positions of the generated authentication parameter.

21. A management node for managing a device operable to join a network, the management node adapted to:
receive from the device a request to join the network, the request comprising a device specific parameter and a token;
generate an authentication parameter from the device specific parameter and the token; and
authorise the device to join the network if the authentication parameter fulfils a validity criterion,
wherein generating the authentication parameter from the device specific parameter and the token comprises:
generating an input comprising the device specific parameter and the token;
computing a cryptographic function of the generated input; and
setting an output of the cryptographic function as the authentication parameter,
wherein the validity criterion comprises a required value for characters in specified positions of the generated authentication parameter.

22. A device operable to join a network, the device comprising a processor and a memory, the memory containing instructions executable by the processor such that the device is operable to:
retrieve a token from a memory;
generate a message requesting to join the network, the message comprising a device specific parameter and the token; and
send the message to a management node reachable via the network,
wherein the token comprises a solution to a cryptographic puzzle such that when combined with at least the device specific parameter and an input to a cryptographic function, the token causes the cryptographic function to generate an authentication parameter satisfying a validity criterion,
wherein the validity criterion comprises a required value for characters in specified positions of the generated authentication parameter.

23. A device operable to join a network, the device adapted to:
retrieve a token from a memory;
generate a message requesting to join the network, the message comprising a device specific parameter and the token; and
send the message to a management node reachable via the network,
wherein the token comprises a solution to a cryptographic puzzle such that when combined with at least the device specific parameter and an input to a cryptographic function, the token causes the cryptographic function to generate an authentication parameter satisfying a validity criterion,
wherein the validity criterion comprises a required value for characters in specified positions of the generated authentication parameter.

* * * * *